United States Patent

Yamazaki

[11] Patent Number: 5,873,293
[45] Date of Patent: Feb. 23, 1999

[54] METHOD AND DEVICE FOR SLITTING MAGNETIC RECORDING MEDIUM

[75] Inventor: Tuneo Yamazaki, Odawara, Japan

[73] Assignee: Fuji Photo Film Co., Ltd., Kanagawa, Japan

[21] Appl. No.: 818,101

[22] Filed: Mar. 14, 1997

Related U.S. Application Data

[63] Continuation of Ser. No. 311,273, Sep. 23, 1994, abandoned.

[30] Foreign Application Priority Data

Sep. 24, 1993 [JP] Japan ................................. 5-258866

[51] Int. Cl.$^6$ ................................................ B23D 19/06
[52] U.S. Cl. ........................ 83/497; 83/508.3; 83/698.51
[58] Field of Search ........................ 83/497, 62.1, 508.3, 83/496, 503, 698.51

[56] References Cited

U.S. PATENT DOCUMENTS

| | | | |
|---|---|---|---|
| 0,391,750 | 10/1888 | Koegel | 83/497 |
| 391,949 | 10/1888 | Cotrell . | |
| 2,554,027 | 5/1951 | Haswell | 83/497 |
| 2,698,661 | 1/1955 | MacGuarrie | 83/503 |
| 3,518,913 | 7/1970 | Fountain, Jr. | 83/503 |
| 4,014,234 | 3/1977 | Spengler | 83/162 |
| 4,590,829 | 5/1986 | Davidson et al. | 83/497 |
| 4,676,133 | 6/1987 | Fujimura | 83/497 |
| 5,373,766 | 12/1994 | Ranly et al. | 83/497 |

FOREIGN PATENT DOCUMENTS

| | | | |
|---|---|---|---|
| 175986 | 3/1905 | Germany | 83/497 |
| 197007 | 3/1908 | Germany | 83/497 |
| 2677 | 10/1862 | United Kingdom . | |
| 880144 | 10/1961 | United Kingdom | 83/497 |

*Primary Examiner*—Kenneth E. Peterson
*Attorney, Agent, or Firm*—Sughrue, Mion, Zinn, Macpeak & Seas, PLLC

[57] ABSTRACT

A method and device for slitting a magnetic recording medium which can maintain high cutting quality of the cutting edges of upper and lower rotary blades by adjusting the device slightly even if the cutting edges are worn to a certain degree and thus ensure the quality of the slit surface of the magnetic recording medium. When the lower rotary blade 2 and upper rotary blade 1 are slid and rotated with the respective side surfaces of the cutting edges thereof in contact with each other, and a long magnetic recording medium supplied between the upper and lower rotary blades is successively slit to thereby produce a plurality of magnetic recording mediums, an angle of intersection between the rotary shaft 14 of the upper rotary blade 1 and the rotary shaft 24 of the lower rotary blade 2 is adjusted according to the states of wear of the upper and lower rotary blades.

7 Claims, 4 Drawing Sheets

METHOD AND DEVICE FOR SLITTING MAGNETIC RECORDING MEDIUM

This Application is a continuation of Ser. No. 08/311,273, filed 23 Sep. 1994, now abandoned.

BACKGROUND OF THE INVENTION

1. Field of the Invention

The present invention relates to a method and a device for slitting a magnetic recording medium and, in particular, to such method and device which slide and rotate the respective cutting edges of upper and lower rotary blades to thereby slit a wide magnetic recording medium into a plurality of narrow magnetic recording mediums.

2. Description of the Related Art

Conventionally, in various fields, there are used a magnetic tape cassette such as an audio cassette, a video cassette and the like in which a long magnetic tape wound round a hub or the like is incorporated in a freely movable manner, and a magnetic disk cartridge in which a circular magnetic disk is movably stored. A magnetic recording medium including the magnetic tape, magnetic disk and the like is treated in the form of a long tape in its manufacturing process.

In manufacturing the magnetic recording medium, generally, a magnetic paint is coated on a plastic film and is then dried to form a magnetic layer. Alternatively, a ferromagnetic material is coated on a plastic film base by vacuum evaporation, sputtering or the like to form a magnetic layer, thereby producing a wide magnetic tape blank. After that, the wide magnetic tape blank is cut by a slitter into a magnetic tape having a given width.

A slitting device for slitting the magnetic tape blank is known in which, normally, a magnetic tape blank is moved between two or more pairs of an upwardly located disk-like upper rotary blade and a downwardly located disk-like lower rotary blade rubbing against each other. The magnetic tape blank is pressure slit by the upper and lower rotary blades to thereby manufacture a plurality of magnetic tapes each having a given width.

In a method using the above slitting device, the slitting speed is fast and the productivity is high. However, since the magnetic tape blank is slit from above by the upper rotary blade, there can be left, in the slit edge surface of the resultant magnetic tape having a given width, a slit trace extending in the longitudinal direction of the slit edge surface. Also, the magnetic layer may be removed from the slit edge surface. Additionally, when the magnetic tape is moved within a cassette or a recording and reproducing apparatus, the magnetic tape may contact the flange surface of a guide roller or the like to cause the removal of the magnetic layer and the shaving off of the plastic film base to thereby produce dropouts, so that the electromagnetic conversion characteristic of the magnetic tape may deteriorate.

Therefore, to solve the above-mentioned problems, several methods have been proposed. For example, in Japanese Patent Publication No. 62-202385 of Showa, there is disclosed a method in which the angle of a cutting edge of a cutting blade is set at a given angle with respect to a moving magnetic tape blank or the speed of rotation of a rotary blade is set in a given range.

However, in this method as well, when the cutting edge becomes dull, the surface quality of the cut portion deteriorates and, therefore, the cutting edge must be frequently replaced. The manufacturing line must be stopped for a relatively long time whenever the cutting edge is replaced.

Also, in Japanese Patent Publication No. 2-41892 of Heisei there is disclosed a structure of a slitting knife in which, in the finishing structure of a cutting edge of a disk-shaped upper rotary blade, the cutting edge of the upper rotary blade is formed in a recessed structure that allows the cutting edge of the upper rotary blade to contact a lower rotary blade at a given angle. That is, by working the cutting edge of the upper rotary blade to have a given angle in the recessing direction, even if the cutting edge is somewhat worn, the cutting quality of the cutting edge can be adequately maintained.

As described above, conventionally, there have been proposed several devices which aim at maintaining the cutting quality of the cutting edge even after it is used for a long period of time. In any of them, after the cutting edge is worn a given amount, the cutting edge must be whetted again to thereby keep the shape of the cutting edge at a given level at all times. If the cutting edge is worn further, then the worn cutting edge must be replaced with a new one. This inevitably results in operational losses and increases costs.

SUMMARY OF THE INVENTION

The present invention aims at eliminating the problems found in the above-mentioned conventional methods and devices. Accordingly, it is an object of the invention to provide a method of slitting a magnetic recording medium which, even if a cutting edge is worn to a certain degree, can maintain the cutting quality of a cutting edge by adjusting a slitting device to a slight degree, and a slitting device which can extend the life of the cutting edge to thereby improve the operation rate thereof as well as reduce costs associated with re-whetting and the like.

In attaining the above object, according to the invention, there is provided a method of sliding and rotating upper and lower rotary blades with the respective cutting edge side surfaces thereof rubbing against each other to thereby slit long magnetic recording mediums supplied successively between the upper and lower rotary blades into a plurality of magnetic recording mediums, wherein an angle of intersection between the rotary shaft of the upper rotary blade and the rotary shaft of the lower rotary blade can be adjusted according to the states of wear of the cutting edges thereof. The above object can also be achieved by a slitting method in which the angle of intersection can be adjusted according to the slitting distances of the magnetic recording medium instead of the states of wear of the cutting edges.

Also, in attaining the above object, according to the invention, there is provided a method of sliding and rotating upper and lower rotary blades with the respective cutting edge side surfaces thereof rubbing against each other to slit a long magnetic recording medium supplied between the upper and lower rotary blades into a plurality of magnetic recording mediums. According to this method, a rotating means for rotating one of the rotary shafts of the upper and lower rotary blades along the moving surface of the magnetic recording medium substantially about the central portion of the magnetic recording medium in the width direction thereof to thereby change the angle of intersection thereof with the other rotary shaft are respectively mounted on bearing portions provided in the two end portions of the rotary shaft. Further, the above object of the invention can also be achieved by a device for slitting a magnetic recording medium, which comprises an upper block for rotatably holding the rotary shaft of the upper rotary blade and a lower block for rotatably holding the rotary shaft of the lower rotary blade, a fixing member for fixing the upper and lower blocks to each other, and a fine adjustment device lying across both the upper and lower blocks for finely adjusting the relative positions of the upper and lower blocks.

DESCRIPTION OF THE PREFERRED EMBODIMENT

Now, an embodiment of a method and a device for slitting a magnetic recording medium according to the invention will be described below with reference to the accompanying drawings.

Figure 1:
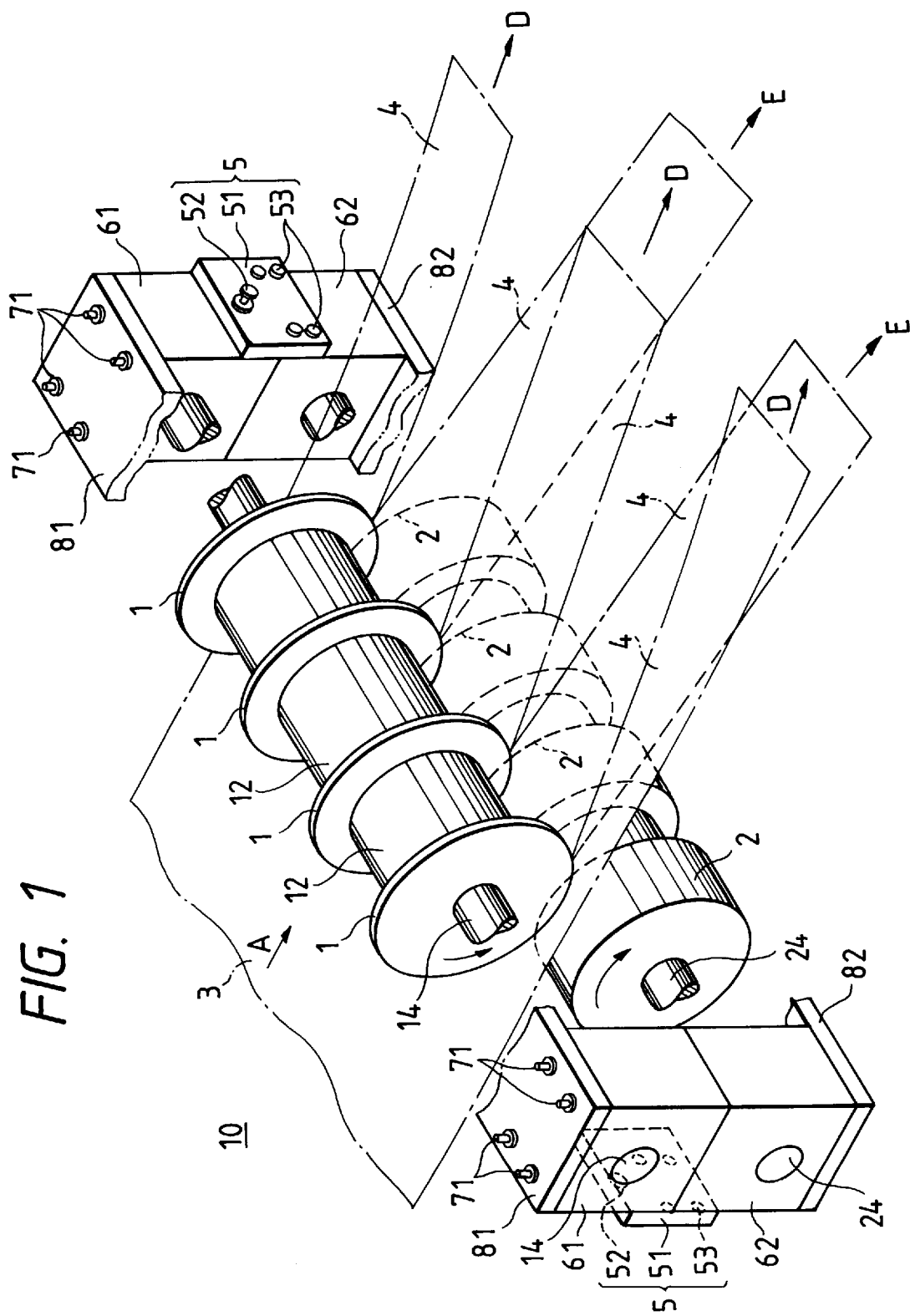
FIG. 1 is a perspective view of the main portions of a slitting device for slitting a magnetic recording medium according to the invention.
Figure 2:
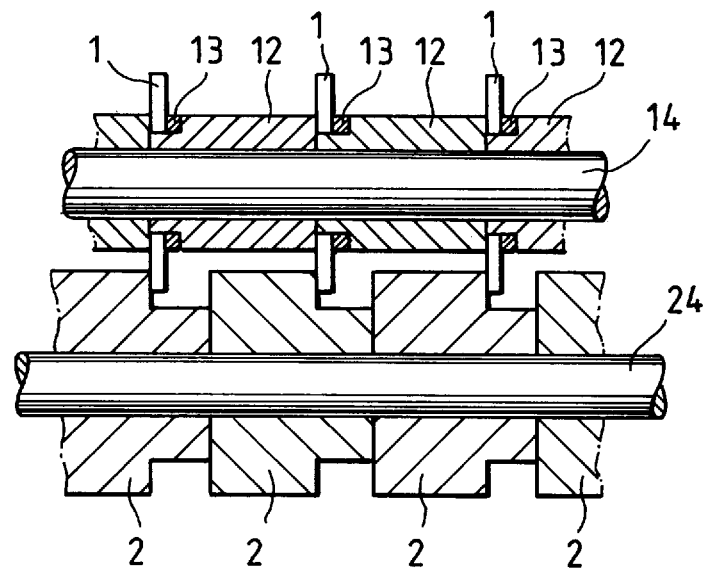
FIG. 2 is a schematic section view of the portions of upper and lower rotary blades extending along their respective rotary shafts shown in FIG. 1.
Figure 3:
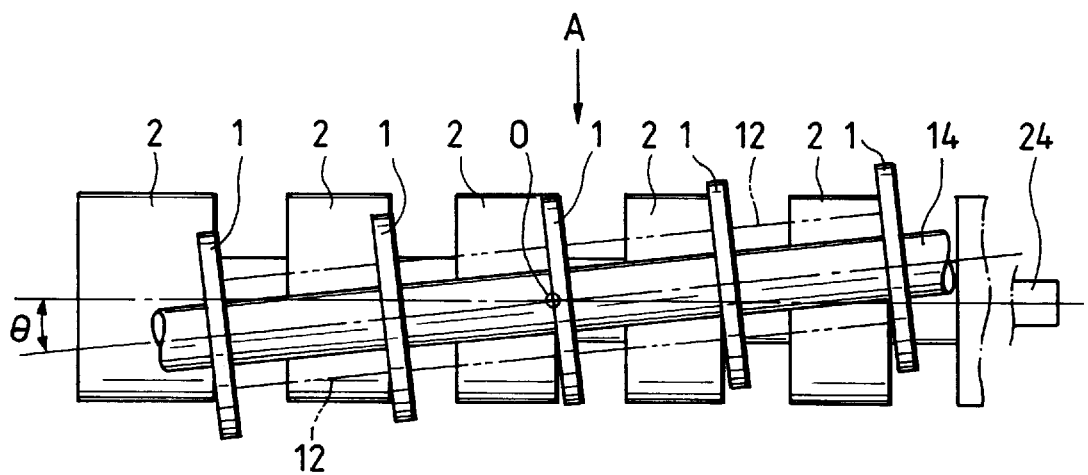
FIG. 3 is a schematic plan view of the slitting device shown in FIG. 1, showing an angle of intersection between the rotary shafts of the upper and lower rotary blades.
Figure 4:
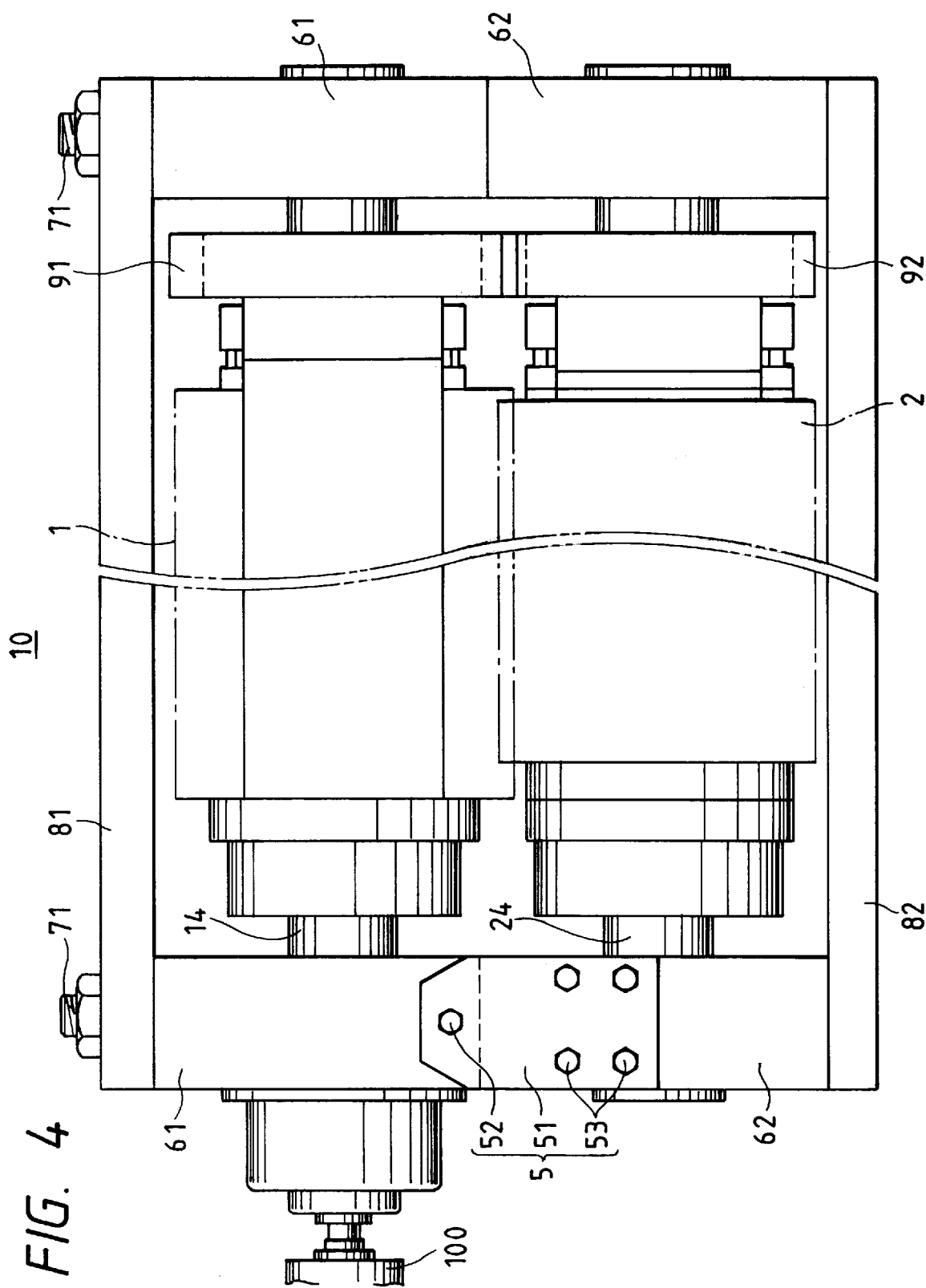
FIG. 4 is a front view of the slitting device shown in FIG. 1.
Figure 5:
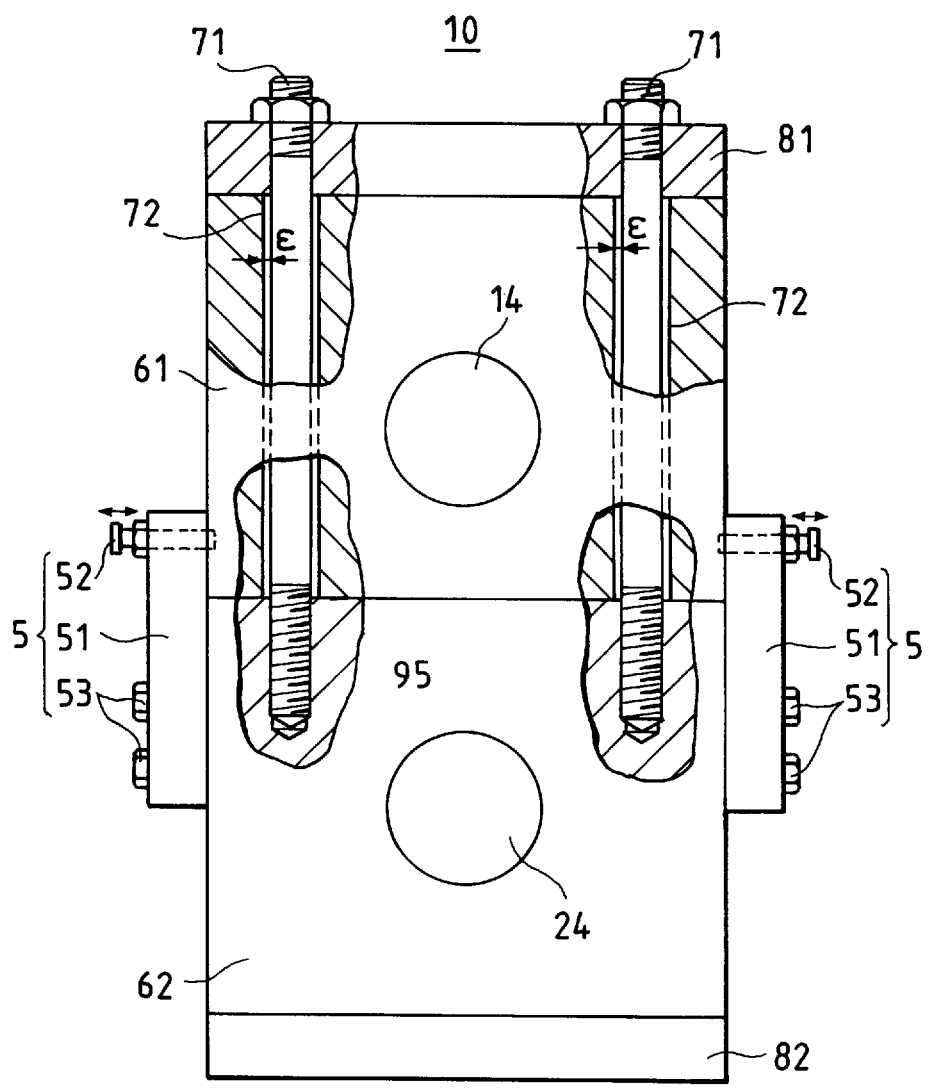
FIG. 5 is a side view of the slitting device shown in FIG. 1.

FIG. 1 is a perspective view of the main portions of the present embodiment of a device for slitting a magnetic recording medium. FIG. 2 is a section view of the portions of the upper and lower rotary blades extending along the respective rotary shafts thereof shown in FIG. 1. FIG. 3 is a plan view used to illustrate an angle of intersection between the rotary shafts of the upper and lower rotary blades. FIG. 4 is a front view of the present slitting device, and FIG. 5 is a side view of the present slitting device.

In the description of the present embodiment, for convenience of explanation, a wide magnetic recording medium before slitting is referred to as a magnetic tape blank, while a narrow magnetic recording medium after slitting is referred to as a magnetic tape.

In a slitting device 10 for slitting a magnetic tape blank 3 according to the present embodiment, an upper rotary blade shaft 14 with a large number of upper rotary blades 1 fixed thereto is rotatably supported by upper bearing blocks 61, 61, while a lower rotary blade shaft 24 with a large number of lower rotary blades 2 respectively corresponding to the upper rotary blades 1 is rotatably supported by lower bearing blocks 62, 62. Also, the respective contact surfaces of the upper and lower bearing blocks 61, 62 are oriented at right angles with respect to a surface including the upper and lower rotary blades 1, 2. That is, in this case, the contact surfaces of the bearing blocks 61, 62 are horizontal. The upper bearing blocks 61, 61 are structured such that they can be changed by intersection angle fine adjustment devices 5 respectively provided on the two rotary blade shafts 14, 24. The intersection angle fine adjustment devices 5 which will be discussed in detail later, are respectively provided on the side surfaces of the lower bearing blocks 62, 62 such that they can swing the upper rotary blade shaft 14 about the longitudinal central portion thereof as a center.

The upper and lower rotary blade shafts 14 and 24 are rotationally driven by a motor 100 (see FIG. 4) respectively in direction B and direction C for biting the magnetic tape blank 3 with respect to the moving direction A of the magnetic tape blank 3. Also, magnetic tapes 4 each having a given width, which are respectively produced by slitting the magnetic tape blank 3, are respectively distributed in upper and lower directions (D, E directions) and are then wound round a plurality of magnetic tape reels (not shown) disposed in the rear of the slitting device 10 and arranged in parallel to one another in the vertical direction.

The lower rotary blade 2 has a relatively thick cutting edge and a plurality of lower rotary blades 2 are mounted on the lower rotary blade shaft 24. On the other hand, the upper rotary blades 1 are mounted on the upper rotary blade shaft 14 through distance pieces 12 in such a manner that they correspond to the distance between the lower rotary blades 2.

Also, as shown in FIG. 2, the respective lower rotary blades 2 are pushed in the thrust direction by their associated elastic members 13 provided on the distance pieces 12. This prevents the upper rotary blade 1 from separating from the lower rotary blade 2 due to resistance produced when the magnetic tape blank 3 is slit, and also assures good overlapping conditions between the respective upper and lower rotary blades.

In the slitting device 10, the respective upper and lower bearing blocks 61, 62 of the upper and lower rotary blades 1, 2 are secured to each other by a connecting top plate 81 and a connecting bottom plate 82 and are properly fastened. As shown in FIG. 4, the upper rotary blade shaft 14 is rotated by the motor 100 serving as a drive source and a gear 91 fixed to the upper rotary blade shaft 14 meshes with a gear 92 fixed to the lower rotary blade shaft 24, whereby the lower rotary blade 2 can be driven rotationally in the opposite direction to the upper rotary blade 1.

Referring now to the structure of the fine adjustment devices 5, for example, plate members 51, 51 are mounted on and fixed to the lower bearing blocks 62, 62 respectively by a plurality of mounting bolts 53, while the plate members 51, 51 project partly on the upper bearing blocks 61, 61 respectively and adjusting screws 52, 52 are provided in the projected portions respectively. In other words, the adjusting screws 52, 52 are structured such that they extend through the respective plate members 51 and the leading ends thereof are able to press against the side surfaces of the upper bearing blocks 61, 61 respectively.

Therefore, by screwing the adjust screws 52, 52, the upper bearing blocks 61, 61 can be pushed in the horizontally lateral direction in mutually opposite directions, so that the upper rotary blade shaft 14 can be rotated about its central portion θ in the longitudinal direction thereof to thereby finely adjust an angle of intersection θ, as shown in FIG. 3.

The intersection angle θ can be adjusted, for example, in the range of up to 0.5 degrees when the width of the magnetic tape blank is of the order of 1,100 mm and the diameter of the upper and lower rotary blades 1, 2 is of the order of 150 to 130 min.

On the other hand, the fixing members of the upper bearing blocks 61, 61 can be formed of, for example, a plurality of fixing bolts 71 which extend through the upper bearing blocks 61, 61 and are threadedly engaged with the lower bearing blocks 62, 62. The connecting top plate 81 is also fixed together with the upper bearing block 61.

Also, bolt holes 72 respectively formed in the upper bearing blocks 61, 61 through which the fixing bolts 71 extend are arranged to have a size which allows movement of the upper bearing blocks 61, 61. When the intersection angle is adjusted, the fixing bolts 71 are loosened, the upper bearing blocks 61, 61 are respectively moved a given amount by the adjust screws 52, 52 to thereby adjust the intersection angle, after which the fixing bolts 71 are tightened to thereby fix the upper bearing blocks 61, 61 again. Of course, in the movement of the upper bearing blocks for the adjustment of the intersection angle, the upper bearing blocks can be moved by an amount corresponding to a clearance ε between the bolt hole 72 and fixing bolt 71 and thus the intersection angle θ of the upper rotary blade shaft 14 can be adjusted in the allowed range of the movement.

Referring now to the adjustment of the intersection angle θ, the amount of adjustment of the intersection angle θ can be determined, for example, by marking suitable scales 95 on the contact end faces or the like of the upper and lower bearing blocks 61 and 62.

When adjusting the intersection angle θ of the above-mentioned slitting device 10, the intersection angle θ is adjusted so as to increase gradually as the amount of wear of the upper and lower rotary blades 1 and 2 increases. The timing of this adjustment, for example, may be controlled in such a manner that, when the slitting length of the magnetic tape blank 3 reaches a given amount, the intersection angle θ is increased by a given amount. The amount of adjustment of the intersection angle θ can be set at a proper time by checking a relationship between the slitting length of the magnetic tape blank 3 and the states of wear of the upper and lower rotary blades 1, 2 in the step of slitting the magnetic tape blank 3. Additionally, when the slitting length reaches the next given length, the intersection angle fine adjustment operation is performed repetitively, so that the upper and lower rotary blades 1, 2 can be used for a very long period of time.

As a result of such angle adjustment of the upper rotary blade 1, the butting condition between the upper and lower rotary blades again falls in a suitable range, thus allowing the upper and lower rotary blades to consistently slit the magnetic tape blank 3 well, so that the quality of the slit surface of the magnetic tape 4 can be kept very high. Also, the time necessary for this adjustment is short when compared with the replacement of the conventional rotary blades, thereby improving the slitting performance of the slitting device.

As has been described heretofore, according to the invention, the angle of intersection between the upper and lower rotary blades is gradually increased in accordance with the slitting length of the magnetic recording medium, such as a magnetic tape blank, to thereby enable the butting condition between the upper and lower rotary blades to be suitably maintained in accordance with the states of wear of the upper and lower rotary blades.

Due to this, even if the cutting edges of the upper and lower rotary blades are worn to a certain degree, the cutting quality thereof can be maintained by adjusting them slightly, which makes it possible to preserve the quality of the slit surface of the slit magnetic recording medium and also to prevent the magnetic layer and film base from being removed from the slit surface. Also, since operations such as replacement of the rotary blades and the like can be reduced when compared with the conventional method and device, the working ratio of the slitting device can be improved in its slitting operation and costs necessary for rewhetting of the cutting edges can be reduced. That is, the maintenance performance of the slitting device can be improved.

Next, description will be given below which clearly portrays the effects of the invention by comparing the embodiment of the invention with a comparison example.

Here, in the present embodiment, by using the slitting device 10 described in the above-mentioned embodiment, a test for slitting a magnetic recording medium was conducted.

As the magnetic tape blank 3, a blank formed of iron oxide and having a width of 1,100 mm for use in a VHS-type cassette was used, and was slit to a width of ½ inch.

The magnetic tape blank was produced by forming a magnetic layer with a thickness of 2.5 μm on a film base of polyethylene terephthalate with a thickness of 10 μm.

Referring to other experimental conditions, the feed speed of the tape was 500 m/min., the diameter of the upper rotary blade was 150 mm, the diameter of the lower rotary blade was 130 mm, the number of revolutions of the upper rotary blade was 1,060 rpm, the number of revolutions of the lower rotary blade was 1,250 rpm, and the maximum amount of overlapping between the upper and lower rotary blades was 0.3 mm.

As shown in Table 1, the intersection angle θ between the upper and lower rotary blades 1 and 2 was gradually increased according to the amounts of wear of the blades produced corresponding to the slit lengths of the magnetic tape blank.

TABLE 1

| Angle of intersection (θ) | Slit length (10 km) | | | | | |
|---|---|---|---|---|---|---|
| | 0–15 | 16–30 | 31–45 | 46–60 | 61–75 | 76–90 |
| 0° | o→Δ ↓ | | | | | |
| 0.05° | o | o | o→Δ ↓ | | | |
| 0.1° | | | o | o→Δ ↓ | | |
| 0.2° | | | | o | o→Δ ↓ | |
| 0.3° | | | | | o | o→x ↓ |
| 0.5° | | | | | | Δ ↓ |
| 0.6° | | | | | | x |

As for the adjustment timing of the intersection angle θ, the angle was adjusted by 0.05 deg. every 150 km. Adjustment timing is set based on the data obtained by measuring the profiles of the cutting edges of the upper and lower rotary blades every slit length.

The slit surface of the tape was observed by use of a microscope, and the cutting quality of the upper and lower rotary blades 1 and 2 was evaluated based on whether a crack was found on the slit surface. Three levels of evaluation are shown: o represents a good result; Δ represents a fair result; and x represents a poor result.

As can be seen clearly from Table 1, according to the intersection angle adjusting method of the invention, the adjusting effect was confirmed in the range of the intersection angle up to approximately 0.5 deg. and effective slitting was carried out without replacing the rotary blades until the slit length approached approximately 900 km.

As a comparison example with respect to the above embodiment, with the intersection angle θ constant, the slitting test was conducted under the same conditions as the above embodiment and the results of the test are shown in Table 2.

TABLE 2

| Angle of intersection (θ) | Slit length (10 km) | | |
|---|---|---|---|
| | 0–15 | 16–30 | 31–45 |
| 0° | ○→△ | △→x | |
| 0.05° | ○ | ○→△ | △→x |
| 0.1° | ○ | ○→△ | △→x |
| 0.2° | ○→△ | △→x | |
| 0.3° | △→x | | |
| 0.5° | △→x | | |
| 0.6° | x | | |

According to the test results of the comparison example, when the intersection angle was kept constant, the effective slit length was found to be up to approximately 400 km. Thus in the comparison example, the slit length was half or less than that of the embodiment.

What is claimed is:

1. An apparatus for slitting a magnetic recording medium, said apparatus comprising:

a single upper rotary blade shaft and a single lower rotary blade shaft, said shafts being disposed in separate parallel planes said planes extending perpendicular to a line drawn between said upper rotary blade shaft and said lower rotary blade shaft;

a plurality of upper rotary disk blades supported by said upper rotary blade shaft and a plurality of lower rotary blades supported by said lower rotary blade shaft;

means for rotating said up-per and lower rotary blade shafts relative to each other in opposite directions, said upper rotary blades contacting said lower rotary blades as said upper and lower rotary blades rotate in order to cut a magnetic recording medium into strips as the magnetic recording medium is passed between said upper and lower rotary blades; and means for rotating the upper or lower rotary blade shaft in a respective one of the parallel planes, so that an angle of intersection between said upper rotary blades and said lower rotary blades is changed simultaneously for each rotary blade by the same angular amount.

2. The apparatus recited in claim 1, wherein each of said upper and lower rotary blades has a diameter within a range of 130 mm to 150 mm, and the angle of intersection is between 0 and 0.5 degrees.

3. The apparatus recited in claim 1, wherein said means for rotating the upper or lower rotary blade shaft comprises:

two upper blocks and two lower blocks, the two upper blocks supporting said upper rotary blade shaft on which the upper rotary blades are supported, the two lower blocks supporting said lower rotary blade shaft on which the lower rotary blades are supported;

means for connecting the upper blocks to the lower blocks; and means for moving the upper and lower blocks relative to each other to change the angle of intersection between said upper and lower rotary blades.

4. The apparatus as recited in claim 3, wherein said means for moving the upper and lower blocks relative to each other comprises at least one plate connecting one of the upper blocks with one of the lower blocks, said plate being fixedly secured to the lower block and having an adjustment screw threadably engaged with a screw hole in said plate, an end of said adjustment screw abutting the upper block for pushing the upper block relative to the lower block as said adjustment screw is screwed into and out of the screw hole.

5. The apparatus as recited in claim 4, wherein said plate is positioned on one side of said one of the upper blocks and said one of the lower blocks.

6. The apparatus as recited in claim 4, wherein there are two plates, and one of said two plates is positioned on one side of said one of the upper blocks and said one of the lower blocks, and the other one of said two plates is positioned on an opposite side of the other one of the upper blocks and the other one of the lower blocks.

7. The apparatus as recited in claim 4, wherein said means for connecting the upper blocks to the lower blocks comprises bolts that are screwed to the lower blocks and protrude through unthreaded holes in the upper blocks, the unthreaded holes in the upper blocks having an inner diameter that is slightly greater than the outer diameter of the bolts so that the upper blocks are free to move slightly relative to the lower blocks, and nuts that are screwed on the bolts to fix the relative position of the upper and lower blocks after the upper blocks are positioned with respect to the lower blocks by said means for moving the upper and lower blocks relative to each other.

* * * * *